United States Patent [19]

Jokay

[11] 3,930,057

[45] Dec. 30, 1975

[54] HIGH CALORIE PUDDING
[75] Inventor: Louis Jokay, Niles, Ill.
[73] Assignee: G. D. Searle & Co., Chicago, Ill.
[22] Filed: Mar. 20, 1975
[21] Appl. No.: 560,306

[52] U.S. Cl. ................................ 426/577; 426/804
[51] Int. Cl.² ...................... A23L 1/187; A23L 1/04
[58] Field of Search .......... 426/573, 577, 579, 804, 426/810

[56] References Cited
UNITED STATES PATENTS
2,784,099 3/1957 Block et al............................ 426/577
3,493,394 2/1970 Eldridge et al...................... 426/577

*Primary Examiner*—Jeanette M. Hunter
*Attorney, Agent, or Firm*—John J. McDonnell

[57] ABSTRACT

The present invention concerns a high calorie pudding substantially devoid of sodium, potassium and protein comprising 40–60 percent of a 3–10 percent fruit pectin solution, 20–30 percent sugar, 25 percent of edible vegetable oils which are normally liquid above 75°F. and have a (polyunsaturate/saturate) ratio of about (2/1), flavor, and coloring. The high colorie pudding of the present invention may also contain small amounts of xanthan gum or non ionic surfactant to further improve the texture of the product.

9 Claims, No Drawings

HIGH CALORIE PUDDING

Renal patients require diets restricted in sodium, potassium, and protein content. Table I sets out the recommended sodium, potassium and protein intake for a renal patient and the intake of a normal adult.

TABLE 1

|  | Renal | Normal |
|---|---|---|
| protein | 17–20 gm. | 65 gm. |
| potassium | 18–19 Meq. | 50–100 Meq. |
| sodium | 13–15 Meq. | 100–300 Meq. |

The restrictive renal diet provides limited caloric intake, since the reduced amounts of sodium, potassium, and protein serve to act as limiting factors in the diet. Table II sets out a diet recommended for renal patients.

TABLE II

Mayo Clinic Restricted Diet for Renal Patients:

| BREAKFAST | SERVING (Grams) | PROTEIN (Grams) | WATER (Grams) | CALORIES (Per Serving) |
|---|---|---|---|---|
| Puffed Rice | 15 | 1.61 | 26.07 | 57.35 |
| Whipping Cream (32% Fat) | 60 | 1.50 | 37.30 | 180.00 |
| Low Protein Bread | 50 | 0.27 | 24.40 | 93.40 |
| Margarine, Salt Free | 15 | 0.09 | 2.33 | 108.00 |
| Jam | 15 | 0.09 | 4.35 | 40.80 |
| Strawberries, Whole, Frozen, and Sweetened | 50 | –.26 | 41.46 | 31.69 |
| NOON MEAL | | | | |
| Hard Boiled Egg | 50 | 6.45 | 36.85 | 81.50 |
| Lettuce | 50 | 0.49 | 38.75 | 9.66 |
| Mayonnaise, Salt Free | 15 | 0.16 | 2.26 | 107.70 |
| Low Protein Bread | 50 | 0.27 | 24.40 | 93.40 |
| Margarine, Salt Free | 15 | 0.09 | 2.33 | 108.00 |
| Fruit Cocktail | 50 | 0.26 | 41.46 | 31.69 |
| EVENING MEAL | | | | |
| Scrambled Eggs | 50 | 6.45 | 36.80 | 81.50 |
| Baked Potatoes | 50 | 1.46 | 40.50 | 35.50 |
| Low Protein Bread | 50 | 0.27 | 24.40 | 93.40 |
| Carrots, Salt Free (Cooked) | 50 | 0.49 | 38.75 | 9.66 |
| Margarine, Salt Free | 15 | 0.09 | 2.33 | 108.00 |
| Jam | 15 | 0.09 | 4.35 | 40.80 |
| Lemon Drops | 30 | 0.00 | 0.42 | 115.80 |
| FOR ALL THREE MEALS: | | | | |
| Total Protein — 20 gm. | | | | |
| Total Moisture — 430 gm. | | | | |
| Calories — 1,430 | | | | |

As can be observed from Table II such a diet is monotonous and unappetizing. Often renal patients refuse to consume the recommended large amounts of salt free margarine, mayonnaise, and whipping cream and consequently their caloric intake is dramatically reduced and they lose weight and strength.

It is therefore an object of this invention to prepare for renal patients a tasty and appetizing high caloric food supplement which is substantially devoid of sodium, potassium and protein.

The present invention concerns a high calorie pudding substantially devoid of sodium, potassium and protein comprising 40–60 percent of a 3–10 percent fruit pectin solution, 20–30 percent sugar, about 25 percent of edible vegetable oils which are normally liquid above 75°F. and have a (polyunsaturate/saturate) ratio of about (2/1), and consumable flavor and coloring. The high calorie pudding of the present invention may also contain small amounts of xanthan gum or non-ionic surfactant to further improve the texture of the product. The high calorie pudding of the present invention unexpectedly may be repeatedly frozen and thawed without losing texture or flavor and therby retains its appetizing properties upon storage and handling. The pudding of the present invention is also advantageous in that it may be eaten in the frozen or thawed state. The latter is possible because of a "short break" characteristic. That is the pudding does not form extended strings of pudding when brought from the dish to mouth by spoon. The high calorie pudding of the present invention is useful as a tasty, appetizing and nutritious food for renal patients who require a diet restricted in sodium, potassium and protein content.

Pectins are gums of recognized importance in the food industry (Industrial Gums, Whister 2nd Ed. Academic Press, N.Y. 1973 Chap. XIX).

Pectin is a general term for a group of polysaccharide substances present in the cell walls of all plant tissues which functions in combination with cellulosic material, as an intercellular cementing material. The main component of this group is a linear D-galacturanan, many of the carboxyl groups of which are esterified with methanol. Other members include L-arabinan and D-galactan components, whose combined presence may account for up to 20 percent of the weight of the polymer.

The main raw material for pectin today is the peel of citrus fruits, preferably lemon peel, but peel of lime, orange, apple and grapefruit are also used. Pectin is a constituent of the albedo, the white, spongy, inner part of the peel, and of the internal membranes within the fruit. The peel used in pectin production is obtained from juice industries, is void of juice and most of the essential oils, and has normally been washed to remove excess soluble materials and dried. The peel after juice extraction contains 2–4 percent pectin and in dried form 20–40 percent pectin.

A wide variety of grades and qualities of pectins are suitable for practicing the present invention. The pectin should be essentially free of protein, sodium and potassium. Therefore, pectins having a high degree of esterification are especially preferred because of their low sodium and potassium content. Commercially available pectins such as pectins sold as Fruit Topping Powder by National Pectin Prod. and Pure Citrus N.F. No. 3442 sold by Sunkist are examples of suitable commercially available pectins. pectins are blended into the food products of the present invention in dilute aqueous solutions, preferably 1–8 percent concentration with the most preferred range being 1.5–5 percent of fruit pectin in water. Typically 40–60 percent of a 3–10 percent fruit pectin in water solution is blended with ingredients to be hereafter described. Preferably 50 percent of a 3–8 percent fruit pectin in water solution is used in conjunction with other ingredients. Those skilled in the food blending arts will recognize the interchangeability of a large number of pectins.

Edible vegetable oils suitable for practicing the present invention are blends of vegetable oils such as cottonseed, sunflower, corn and safflower shich are normally liquid above 75°F. and have a (polyunsaturate/saturate) ratio of about (2/1). These oils should be substantially free of protein, sodium and potassium. They may contain food compatable antioxidants and antifoaming agents. An edible vegetable oil blend suitable for practicing the present invention is sold as under the trade name Hi-Tone by Swift (Edible Oil Company), Chicago, Illinois. Hi-Tone is characterized as follows:

Ingredients: Made from selected vegetable oil. BHA (Butylated Hydroxy Anisole) and BHT (Butylated Hydroxy Toluene) are added to improve stability to oxidation. Dimethyl polysiloxan is added as an antifoaming agent.

|  | Typical Values per 100 Grams |
|---|---|
| Calories | 900 |
| Protein | 0 |
| Carbohydrate | 0 |
| Fat | 100 grams |
| Polyunsaturated* (Cis-cis methylene interrupted polyunsaturated fatty acid) | 28 |
| Saturated (Lauric and higher saturated fatty acids) | 15 |
| Cholesterol | 0 mgs. |

*Contains less than 2% U.S. RDA of protein, vitamin C, thiamin, riboflavin, niacin, calcium and iron.

Those skilled in the food blending arts will recognize a wide variety of interchangeable edible vegetable oils suitable for practicing the present invention.

Flavors such as strawberry, lemon, banana, orange, chocolate and rum may be conveniently combined with above described ingredients to improve the palatability of the high calorie pudding and coloring agents may be added to improve the visual appeal of the high calorie pudding. Likewise, vitamins such as A, $B_1$, $B_2$, $B_6$, $_{12}$, C, D, E, and niacin may be added in appropriate amounts to supply any desired percentage of the minimum daily requirement. Minerals such as calcium and phosphorous in the form of consumable soluble salts, iodine, iron (ferrous fumarate) or magnesium (magnesium oxide) may also be added.

Consumable emulsifying agents are useful for improving the texture of the products of the present invention. Polysorbate 60 U.S.P. (sold under the trademark of Tween 60 by Atlas Powder Co., Wilmington, Delaware) in concentrations of 0.02 to 0.08 percent is a preferred non-ionic surfactant. Polysorbate 60 U.S.P. (Tween) is an oleate ester of sorbitol and its anhydrides condensed with polymers of ethylene oxide. This consumable polysorbate non-ionic surfactant is more fully described at page 225 of Remington's Practice of Pharmacy, Martin and Cook (1961). 0.02–0.08 is the preferred Tween 60 concentration.

Xanthan gum is a recognized food ingredient. (Food Technology, Vol. 25, No. 5, pp. 25–31). Xanthan gum is a fermentation product of glucose and is commonly referred to as being a fermentation gum. The xanthan gum which is employed in this invention may be illustrated by the Xanthomonas colloid produced by the bacterium *Xanthomonas campestris*. By the process of fermentation, a long chain polysaccharide is formed which has a periodically repeating "glucose-mannose-glucuronic acid" configuration that is believed to be the key factor in its unique properties. The production of xanthan gum is more fully described in U.S. Pat. No. 3,507,664. Xanthan gum sold under the trade name Keltrol by Kelco Company, San Diego, California, is particularly suited for practicing the present invention. About 0.03–0.30 percent of xanthan gum represents the preferred concentration.

The food product of the present invention provides a renal patient 3 calories for every gram ingested without requiring the consumption of sodium, potassium or protein. Thus the present invention encompasses a high calorie pudding substantially devoid of sodium, potassium and protein comprising:

a. 40–60 percent of a 3–10 percent fruit pectin in water solution
b. 20–30 percent sugar (sucrose or glucose),
c. 20–30 percent of edible vegetable oils which are normally liquid above 75°F. and have (polyunsaturate/saturate) ratio of about (2/1). Preferably the pudding contains consumable flavor and colors.

A preferred consumable flavor is citric acid combined with artificial or natural fruit flavors. The preferred concentrations of the base are about:

I a. 50 percent of a 3–6 percent fruit pectin in water solution
b. 25 percent sugar (sucrose or glucose),
c. 25 percent of edible vegetable oils which are normally liquid above 75°F. and have (polyunsaturate/saturate) ratio of about (2/1) and
d. flavoring, consisting of citric acid and fruit flavor, and coloring.

Typical formulations further containing consumable surface active agents are:

II a. 40–60 percent of a 3–6 percent fruit pectin in water solution
b. 0.02–0.08 percent consumable polysorbate surfactant,
c. 20–30 percent sugar (sucrose or glucose),
d. 25 percent of edible vegetable oils which are normally liquid above 75°F. and have (polyunsaturate/saturate) ratio of about (2/1), and
e. consumable flavors and colors;

III. a. 40–60 percent of a 3–10 percent fruit pectin in water solution,
b. 0.03–0.30 percent xanthan gum,
c. 25 percent sugar (sucrose or glucose),
d. 25 percent of edible vegetable oils which are normally liquid above 75°F. and have (polyunsaturate/saturate) ratio of about (2/1) and
e. consumable flavors and colors;

IV. a. 40–60 percent of a 3–10 percent fruit pectin in water solution, b. 0.03–0.30 percent xanthan gum and 0.02–0.08 percent of a consumable non-ionic surfactants selected from the group comprising mono and diglycerides, polysorbates, ethoxylated mono and diglycerides, polyoxyethylene esthers, and sorbitan esters,
c. 20–30 percent sugar (sucrose or glucose),
d. 25 percent of edible vegetable oils which are normally liquid above 75°F. and have (polyunsaturated/saturate) ratio of about (2/1) and
e. consumable flavors and colors U.S. Pat. No. 3,821,443 and U.S. Pat. No. 3,121,014 describe food products with high fat and carbohydrate content. The high calorie pudding of the present invention is particularly distinct in that it is essentially free of protein, sodium, and potassium and has freeze-thaw stability. Thus the present high calorie pudding is a smooth textured blend which may be repeatedly frozen and thawed and which does not contain conventional protein material used in the food industry as binders such as milk protein, gluten, and gelatin.

The following examples are illustrative of the present invention and are not intended to limit the invention in spirit or scope.

EXAMPLE 1

225 Parts of an aqueous 6 percent pectin solution (Sunkist Pectin N.F., Pure Citrus No. 3442) are added to a blender and 112 parts of edible vegetable oil having a polyunsaturate/saturate ratio of (2/1) and which is liquid above 75°C. (Hi-Tone Oil, Swift & Co.) are blended at high speeds until an emulsion is formed. 112 Parts of confectioners sugar are gradually added with stirring until the mixture is creamy. This mixture provides a basic blend and this blend may be fruit flavored by the addition of 1 part of citric acid and fruit flavors with an appropriate coloring agent. The pudding is placed in plastic containers and frozen for preservation.

EXAMPLE 2

Following the procedure of Example 1, a suitable pudding base may be prepared from:
a. 225 parts of an 8 percent Pectin blend "Fruit topping" powder 631 solution, National Pectin Prod. Co.
b. 112 parts of edible vegetable oil having a (polyunsaturate/saturate) ratio of (2/1) and liquid above 75°F. (Hi-tone Oil, Swift & Co.).
c. 0.35 parts of Tween 60, Atlas Chemical Co., Wilmington, Delaware,
d. 112 parts of confectioners sugar or glucose and
e. consumable flavors and colors

EXAMPLE 3

Identical formulation as in Example 2 except that the Tween 60 is replaced with 1.128 parts of xanthan gum, Keltrol sold by Kelco Co.

EXAMPLE 4

Following the procedure of Example 1, a suitable pudding base may be prepared from:
a. 225 parts of a 6 percent pectin solution,
b. 125 parts of edible vegetable oil having a (polyunsaturate/saturate) ratio of about (2/1)
c. 100 parts of confectioners sugar The addition of 1 part citric acid and suitable consumable fruit flavorings and colorings provides the finished product.

EXAMPLE 5

A further preferred high calorie pudding is prepared by dry blending 103 parts sugar, 16.6 parts of standardized 100 grade pectin, 1.05 parts of xanthan gum, and 0.92 part of anhydrous citric acid. This dry mix is dissolved in 190 parts of water at 160°F. A consumable color is added to 103.3 parts of edible vegetable oil having a polyunsaturate/saturate ratio of (2/1) and this oil is heated to 140°F. Then 0.325 part of Tween is added to the oil blend. The oil blend and aqueous phase is mixed with heavy agitation and then pasteurized at 160°F. for 20–30 minutes. After pasteurization is completed the flavor is added. The mixture is homogenized, filtered, packaged and frozen.

EXAMPLE 6

180 parts of a 10 percent pectin solution (National Pectin 100 grade Fruit Topping Powder) are added to a blender and 112 parts of edible vegetable oil having a P/S ratio of 2:1 and which is liquid above 75°C. (Hi-Tone Oil, Swift & Co.). 0.35 parts of Tween 60$^R$ (Atlas Chemical Co.) and 1.1285 parts of Xanthan gum Keltrol$^R$ (Kelco Co.) plus 10 ml of water are blended at a high speed until an emulsion is formed. 147 parts of partial invert syrup (Nulomoline$^R$, Su-Crest Corp.) containing 76 percent total solids and 46 percent invert sugar are added by stirring until the mixture is creamy. (Proceed as in Example 1.)

EXAMPLE 7

Substitute into Example 5, 103 parts of dextrose instead of sugar.

EXAMPLE 8

Substitute into Example 5, a blend of 51.5 parts dextrose, 51.5 parts of sugar instead of all sugar.

What is claimed is:
1. A high calorie pudding substantially devoid of sodium, potassium and protein comprising:
   a. 40–60 percent of a 3–10 percent fruit pectin in water solution,
   b. 20–30 percent sucrose, dextrose, or mixtures thereof, and
   c. about 20–30 percent of edible vegetable oils which are normally liquid above 75°F. and have a polyunsaturate/saturate ratio of about 2/1.
2. The high calorie pudding of claim 1 further comprising consumable flavors and colors.
3. The high calorie pudding of claim 1 further comprising consumable flavoring consisting of citric acid and artificial or natural fruit flavoring and consumable colors.
4. The high calorie pudding of claim 2 further comprising 0.03–0.30 percent of a consumable emulsifying agent.
5. The high calorie pudding of claim 1 further comprising 0.03–0.30 percent xanthan gum.
6. The high calorie pudding of claim 1 further comprising 0.03–0.30 percent xanthan gum and consumable flavor and colors.
7. The high calorie pudding of claim 1 further comprising 0.02–0.08 percent of a consumable polysorbate non-ionic surfactant.

8. The high calorie pudding of claim 1 further comprising 0.02–0.08 percent of consumable polysorbate non-ionic surfactant and consumable flavors and colors.

9. The high calorie pudding of claim 2 further comprising 0.02–0.08 percent of consumable non-ionic surfactant and 0.03–0.30 percent xanthan gum.

* * * * *